(12) United States Patent
Winter et al.

(10) Patent No.: US 9,746,353 B2
(45) Date of Patent: Aug. 29, 2017

(54) INTELLIGENT SENSOR SYSTEM

(71) Applicants: Kirt Alan Winter, San Diego, CA (US); Jose Julio Doval, Escondido, CA (US)

(72) Inventors: Kirt Alan Winter, San Diego, CA (US); Jose Julio Doval, Escondido, CA (US)

( * ) Notice: Subject to any disclaimer, the term of this patent is extended or adjusted under 35 U.S.C. 154(b) by 779 days.

(21) Appl. No.: 13/912,005

(22) Filed: Jun. 6, 2013

(65) Prior Publication Data

US 2013/0346009 A1 Dec. 26, 2013

Related U.S. Application Data

(60) Provisional application No. 61/662,011, filed on Jun. 20, 2012.

(51) Int. Cl.
*G01D 11/00* (2006.01)
*G01S 13/58* (2006.01)
(Continued)

(52) U.S. Cl.
CPC ............ *G01D 11/00* (2013.01); *G01D 21/02* (2013.01); *G01P 21/02* (2013.01); *G01S 13/58* (2013.01); *G01S 13/581* (2013.01); *G01S 13/867* (2013.01); *G01S 13/88* (2013.01); *G06K 9/00342* (2013.01); *G06K 9/6284* (2013.01);
(Continued)

(58) Field of Classification Search
CPC ........ G01D 11/00; G01D 21/02; G01P 21/02; G01S 13/58; G01S 13/581; G01S 13/867; G01S 13/88; A63B 2069/0006; A63B 2069/0008; A63B 2069/0011; A63B 2220/35; A63B 2220/40; A63B 2220/806; A63B 2220/808; A63B 2220/833; A63B 2220/89; A63B 2225/20; A63B 2225/50; A63B 2230/06; A63B 2230/30; A63B 2230/50
USPC .. 702/75, 79, 93, 94, 96, 97, 104, 106, 141, 702/142, 143, 149, 150, 152, 151, 175, 702/176, 183, 188, 190; 340/901, 435; 342/55, 104; 473/451, 455; 600/300, 600/301
See application file for complete search history.

(56) References Cited

U.S. PATENT DOCUMENTS 5,553,846 A 9/1996 Frye et al.
6,042,492 A 3/2000 Baum
(Continued)

*Primary Examiner* — John H Le
(74) *Attorney, Agent, or Firm* — Mark Wisnosky

(57) ABSTRACT

A sensor system and method of using the system synergistically to improve the accuracy and usefulness of measured results is described. The system is comprised of electronically linked components that act as markers to trigger events, producers that gather data from sensors and aggregators that combine the data from a plurality of producers using triggers from marker devices to select the data of interest. The system is shown to be applicable to selection of data regions of interest and to analysis of the data to improve accuracy. The analysis of the data of any particular sensor within the system makes use of extrinsic data, being data generated by other sensors and intrinsic data, that is data or data limits that are known to be true from nature, laws of physics or just the particular information the user wants to acquire. The system is demonstrated on the analysis of Doppler radar measurements of a thrown object.

5 Claims, 17 Drawing Sheets

(51) Int. Cl.
*G01S 13/86* (2006.01)
*G01P 21/02* (2006.01)
*G01D 21/02* (2006.01)
*G01S 13/88* (2006.01)
*G06K 9/00* (2006.01)
*G06K 9/62* (2006.01)
*A63B 69/00* (2006.01)

(52) U.S. Cl.
CPC ............ *A63B 2069/0006* (2013.01); *A63B 2069/0008* (2013.01); *A63B 2069/0011* (2013.01); *A63B 2220/35* (2013.01); *A63B 2220/40* (2013.01); *A63B 2220/806* (2013.01); *A63B 2220/808* (2013.01); *A63B 2220/833* (2013.01); *A63B 2220/89* (2013.01); *A63B 2225/20* (2013.01); *A63B 2225/50* (2013.01); *A63B 2230/06* (2013.01); *A63B 2230/30* (2013.01); *A63B 2230/50* (2013.01)

(56) References Cited

U.S. PATENT DOCUMENTS

| | | |
|---|---|---|
| 6,292,130 B1 | 9/2001 | Cavallaro |
| 6,366,701 B1 | 4/2002 | Chalom et al. |
| 6,590,669 B1 | 7/2003 | Wagner |
| 6,847,980 B1 | 1/2005 | Benitez et al. |
| 7,369,941 B2 * | 5/2008 | Schiffmann ........... G01S 13/878 340/435 |
| 7,377,180 B2 | 5/2008 | Cunningham |
| 7,387,029 B2 | 6/2008 | Cunningham |
| 2004/0006424 A1 * | 1/2004 | Joyce .................... G01S 5/0027 701/408 |
| 2004/0125877 A1 | 7/2004 | Chang et al. |
| 2004/0225199 A1 * | 11/2004 | Evanyk ................ A61B 5/0002 600/300 |
| 2007/0257814 A1 | 11/2007 | Tilton et al. |
| 2010/0041498 A1 | 2/2010 | Adams |
| 2010/0123830 A1 | 5/2010 | Vunic |

* cited by examiner

INTELLIGENT SENSOR SYSTEM

CROSS-REFERENCE TO RELATED APPLICATIONS

This application claims priority to U.S. Provisional application 61/662,011, filed on 20 Jun. 2012, entitled Intelligent Sensor System, by the same inventors.

STATEMENT REGARDING FEDERALLY SPONSORED RESEARCH OR DEVELOPMENT

Not Applicable.

BACKGROUND OF THE INVENTION

Field of the Invention

The present invention relates to sensors used to capture a sporting or other event and improved analysis of the sensor data.

Related Background Art

The use of sensors in sports and other activities to make measurements of the athlete's performance are becoming ubiquitous. Radar guns have long been used to measure the velocity of a pitched baseball, sensors on bicycles now measure speed, power output, pedaling cadence and heart rate of the rider. Video is being used to capture the swing motion of batters, golfers and tennis players. Slow motion replay of a baseball pitcher's motion or a batter's swing has been used for entertainment, instruction and training. Sensors and analyses of sensor data are used in a wide variety of sports and activities including for example: baseball, golf, tennis and other racket sports, football, gymnastics, dance and for help in rehabilitation of the people who have lost limbs and are learning how to walk or perform other activities with prosthetics.

Virtually all athletic skill development is an iterative process. One must perform a task, measure the outcome of the task and then analyze one's technique in order to improve. If any of these steps are missing in a training environment, this at best hinders the development of the athlete and at worst, prevents it. Young athletes who strive to compete at the highest levels in their sport are generally very self-motivated. They are the ones who work hardest during practice, stay after practice for extra repetitions and often train alone. Measurement is one of the key feedback mechanisms for specific skill development. In basketball, one can compute their shooting percentage for example while training alone. For many athletes, the velocity with which they can propel the ball in their sport is a critical measurement. Standalone radar units have been created to allow an athlete to gain a measure of their performance without the benefit of a coach or other observer being present. Other devices capture the speed, acceleration, and other dynamic attributes of bats, clubs, or racquets.

Inaccuracies in measurements of single events are common. Often the inaccuracies result in outlier data that may mislead the coach or athlete and/or result in lost data. Sifting through the data to pick out accurate data from outliers is a difficult and time consuming task. Outlier data may result from interference, such as an extraneous object in the field of view of the sensor, from electronic noise in the sensor data, or, from analysis of sensor data that is outside of a time range of interest. A means is needed to identify outlier data and remove such data from reporting.

Automatically, capturing the time range of interest is an important missing attribute of current systems. Sensors are often gathering data continuously. Yet the event of interest in the performance of the athlete may be just a few seconds or even fractions of a second buried in a mountain of continuous data. If the sensor is an image sensor for example, a coach or the athlete may sort through the image file to edit down to the time of interest. However this editing may not be readily available if the sensor is that of a radar gun or a heart rate monitor or other such device. A means is needed to sort and select the data of interest that is relevant to performance.

Often there is information that if available to a system analyzing sensor data could improve results. For example a video sensor might be able to pick out when a pitch is made, an audio sensor might provide information when a ball is struck. A radar sensor can determine when an object is moving within the sensor's field of view. A means is needed to make use of multiple sensor input to improve measurement results.

There is also other information available that is intrinsic to the event being captured that may be used to improve measurement results. For example it is extremely unlikely that a pitcher will hurl a baseball at 150 mile per hour, or that a very young pitcher will hurl a baseball at a speed greater than 70 mph. Current radar sensors regularly report such data in measurement results. These outlier measurements might be due to a variety of reasons. For example the radar guns are frequently located behind a screen that might produce interfering signals. Regardless of the source an intelligent analysis system is needed to recognize outlier data and remove it from reporting. There is also more subtle intrinsic data that may be used to improve measurement results. For example a pitched baseball will naturally be decelerating during its transit from the pitcher to the catcher. An intelligent analysis system is needed that can take advantage of this intrinsic knowledge and eliminate measurements of objects that are gaining speed during the measurement interval of interest.

Systems are needed that can repeatedly capture instances of a sporting activity including video and other sensors, make measurements of the outcome of each instance of the activity, automatically synchronize the video with the measurement, edit and analyze each instance of the video so that the athlete can compare actions and results of multiple attempts or instances. Systems are needed that take advantage of extrinsic data from other sensors and intrinsic information regarding the measurement of interest to improve the reported results of the measurement of an athlete's performance.

BRIEF SUMMARY OF THE INVENTION

A system is described that addresses the deficiencies described above. A sensor system is described that makes use of both extrinsic data from a secondary sensor as well as intrinsic data regarding the measurement of interest to provide improved measurement results. One embodiment includes a communication protocol designed to allow various sports measurement devices to use relatively low-frequency RF communications to coordinate recording and measurement activities. In one embodiment a radar gun makes use of a secondary sensor to define the time interval of interest. In one embodiment the secondary sensor is a video sensor. In another embodiment the secondary sensor is an audio sensor that hears the ball hit the catcher's mitt or hears the bat hit the ball when the radar sensor is used to measure the speed of a pitched ball in for example baseball. In another embodiment the secondary sensor is an accelerometer located in the bat of the batter, again in a baseball situation. In another embodiment the secondary sensor is an audio sensor that detects the time of contact of a club head with a golf ball and the primary sensor is a video sensor capturing the golfer's swing. In another embodiment the primary sensor in the golf situation is a radar sensor measuring the speed of the ball. In another embodiment the primary sensor is an array of video sensors measuring the trajectory of the struck golf balls.

In another embodiment, a Doppler radar device that measures speed, an instrumented ball that measures orientation and spin, and a video camera that is placed to record a viewpoint of the pitcher's motion are all electronically linked. The ball and the Doppler device are each in turn "paired" with the video device. The video device is triggered by a wireless signal from the ball and the Doppler device to allow selective recording of important events (i.e. a pitch) and exclusion of non-important movements: the pitcher retrieving the ball or taking a drink. The video device also receives the measurements from the radar and spin rate devices and annotates them into the video. Thereby allowing the user athlete or a coach or fan to see and understand exactly what elements of the pitching motion leads to improved results such as faster throws or increased rotation at the proper angle for the desired pitch movement. The information from each device is aggregated and edited by the aggregator. The edited information provides annotated video for a plurality of events of interest (i.e. pitches) while excluding events not of interest.

In another embodiment a sensor may be used as both a primary measurement device and a secondary extrinsic sensor for a different but simultaneous other measurement. An example in baseball is where a video sensor is used to provide an alert that a pitch has been made so that a radar sensor will make measurements during the time interval of interest. The radar sensor may then be used as a secondary sensor to the same video sensor to indicate the time interval of interest for editing the video to a time interval of interest.

More complex arrangements can be made, but an ease of use factor to the user is that adding devices is just a series of "pairings" between devices. In the baseball example, the ball and radar are each "paired" with the video device. With no further configuration, they will work together to bring the scenario outlined above to fruition.

Another embodiment includes sensors that measure physiological and other parameters related to the participants. Non-limiting examples include heart rate monitors, blood pressure monitors, body temperature monitors and accelerometers. In some embodiments the sensors send signals to the coach warning of conditions of over exertion. In some embodiments the sensors send signals to the coach alerting of under exertion or lack of effort.

In another embodiment intrinsic information regarding the measurement is used. In one embodiment radar sensor data is analyzed making use of the fact that a pitched ball must be decelerating. In another embodiment outlier data is eliminated from sensor data using the fact that a pitched baseball must have a certain minimum speed to be in flight and a certain maximum speed to have been pitched by a human.

In another embodiment a communication protocol that includes three classes of devices is shown: markers, producers and aggregators. A marker detects an event and produces an electronic signal of the event or trigger. A producer collects data during an event. An aggregator collects data from multiple producers. In one embodiment a marker, producer and aggregator are two or three physically separate devices. In another embodiment the marker, producer and aggregator are a physically container in a single device. In another embodiment a producer may function both as a producer and as a marker.

DETAILED DESCRIPTION OF THE INVENTION

Figure 1A:
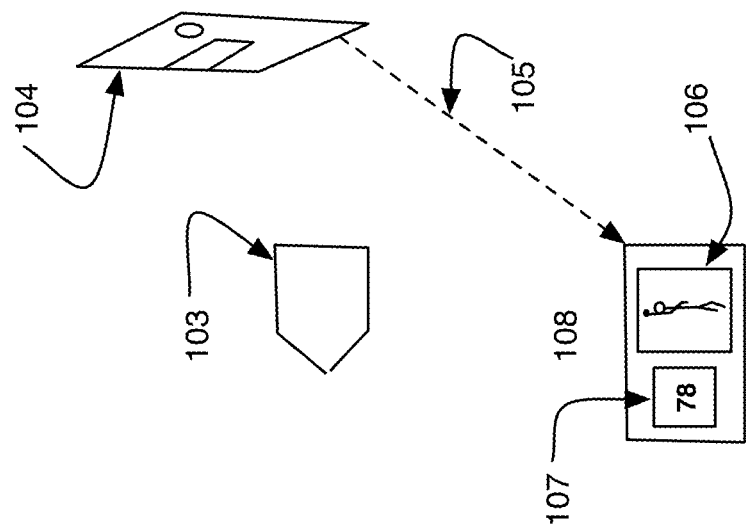
FIG. 1A is a diagram showing a first embodiment baseball example using a radar gun and video camera.

Referring to FIG. 1 an exemplary system and embodiments are shown. A pitcher 101 is throwing a baseball 102 towards a target 103. A sensor object 104 is located behind the target. The sensor in this exemplary embodiment is comprised of a Doppler radar sensor (actually a transmitter and receiver as is known in the art) and a video sensor. The sensor object transmits 105 to a display 108 that shows a video image 106 of the pitcher and the speed 107 of the pitched ball. In another embodiment the display 108 is incorporated into the sensor 104. In this embodiment the video sensor acquires video continuously and uses the extrinsic data from the Doppler radar sensor as an alert and prompt to select a time portion of the video signal to send to the display. In another embodiment the Video sensor stores the recorded video of the pitcher over a time span that is indicated by the Radar sensor. The time span is selected by a user selectable period of a few seconds before and after detection of a moving object that is confirmed to be a baseball. Confirmation is by an analysis that uses extrinsic and intrinsic data as described below.

Figure 1B:
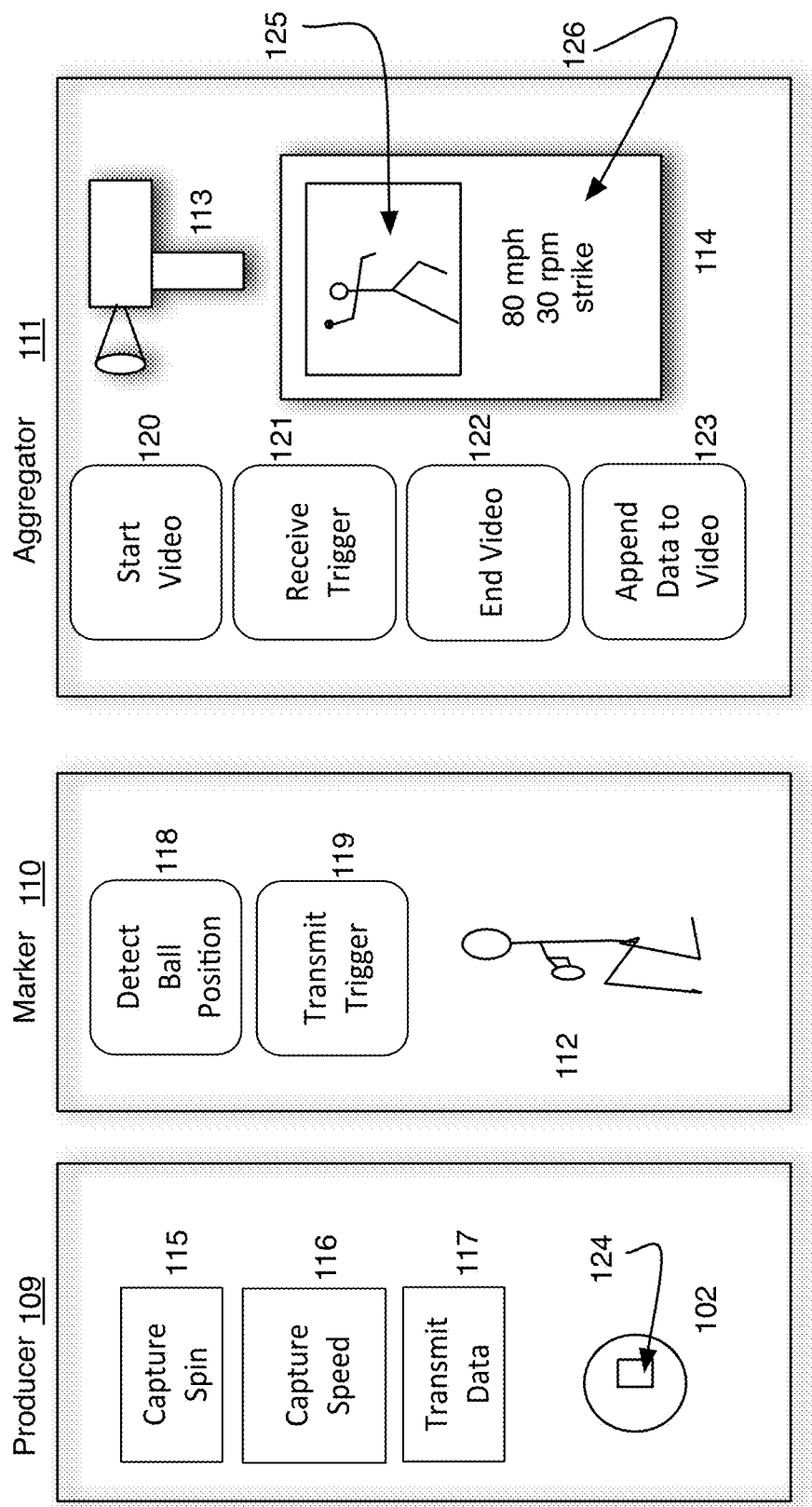
FIG. 1B is a diagram showing components of the communication protocol system of FIG. 1A

In the example shown the communication protocol including markers, producers and aggregators is described. Referring to FIG. 1B, a marker 110 detects events and reports that the event occurred via the use of a "trigger". Markers include an electronic identification "ID" that is assigned to it when it is "paired" with a producer 110 and an aggregator 111. In a preferred embodiment the ID is a 16-bit encoded Identification that is then transmitted with every "trigger" sent by the device. Markers also respond to the commands "enable," "disable," and "power-off," which allows for regulation of their power usage by the Aggregator that controls the Marker. In the baseball embodiment shown a Marker 110 is included in the glove 112 of the catcher. The arrival of the ball in the glove allows the marker 110 to detect the ball position 118 and to send a trigger 119. In one embodiment the marker includes a sensor that detects the sound of the ball hitting the catcher's glove 112. In another embodiment the marker is incorporated into the catcher's glove and includes a sensor that detects the impact of the ball in the glove.

In another embodiment the marker 110 can also be interrogated to retrieve information about the events prior to and following their "trigger". The main purpose of a marker is to inform other devices (Producers and Aggregators) that a specific event they are designed to detect has occurred. If the device makes more data available automatically through its interface than triggers it is both a Marker and a Producer.

Producers 109 have sensors that acquire data related to an event. They may rely on Marker(s) to trigger or complete their actions. Producers may in turn act as Markers themselves in the sense that they can trigger other devices. In the embodiment shown the ball 102 is instrumented to include an accelerometer sensor that can measure position and rotation of the ball. The Producer also includes means to transmit data to the Aggregator 111. In the embodiment shown the Producer 109 captures spin data 115 of the ball, captures the speed of the ball 116 and transmits the data 117.

In another embodiment the Producer presents the data collected without any external triggers required. In the example shown the ball further includes a display 124 that can show data collected including the maximum rotation achieved over the measurement time interval since a last reset.

The Aggregator 111 acquires data from one or more Producer devices 109 and presents that data 114 as an integrated set of information to a user. It is also possible for the Aggregator itself to act as a Marker or a Producer. In the instant case the aggregator further includes a video camera and radar detector 113 that provides video data and speed data for the ball as thrown by the pitcher (not shown) to the catcher. In the instant example the Aggregator 111 includes the functionality of both a Producer and an Aggregator. In the example shown the aggregator includes the process of starting the acquisition of a video 120, receiving a trigger 121, ending the video 122 and appending data to the video 123 producing a video clip and information on the display 114. In the instant case the aggregator produces a video of the pitchers motion 125 as well as data 126 related to the speed, rotation and accuracy of the pitch.

The main goal of a Marker 110 is to produce the "trigger" at the exact moment an event has occurred. However, depending on the analysis required of the data that the Marker collects, this may not be possible. Thus, we introduce the first two types of triggers, the Exact Trigger and the Revisable/Revision trigger pair. For purposes of this document, an Exact Trigger is guaranteed to have occurred within $1/1000$ second of the actual event. A Revisable Trigger is transmitted when a device has determined that the event either has or is about to occur but its exact time cannot be pinpointed. Though the goal is to make the Revisable Trigger as close as possible to the exact time, as some devices may not be able to produce optimal output if a trigger is revised in a negative direction, an example of which would be a still camera. The receiver of a Revisable Trigger is required to note the time that the trigger was received in its own time domain. A Revisable Trigger is always followed within five seconds by a Revision Trigger that notes the time delta (either positive or negative) between the actual event and the time the Revisable Trigger was transmitted.

Figure 2:
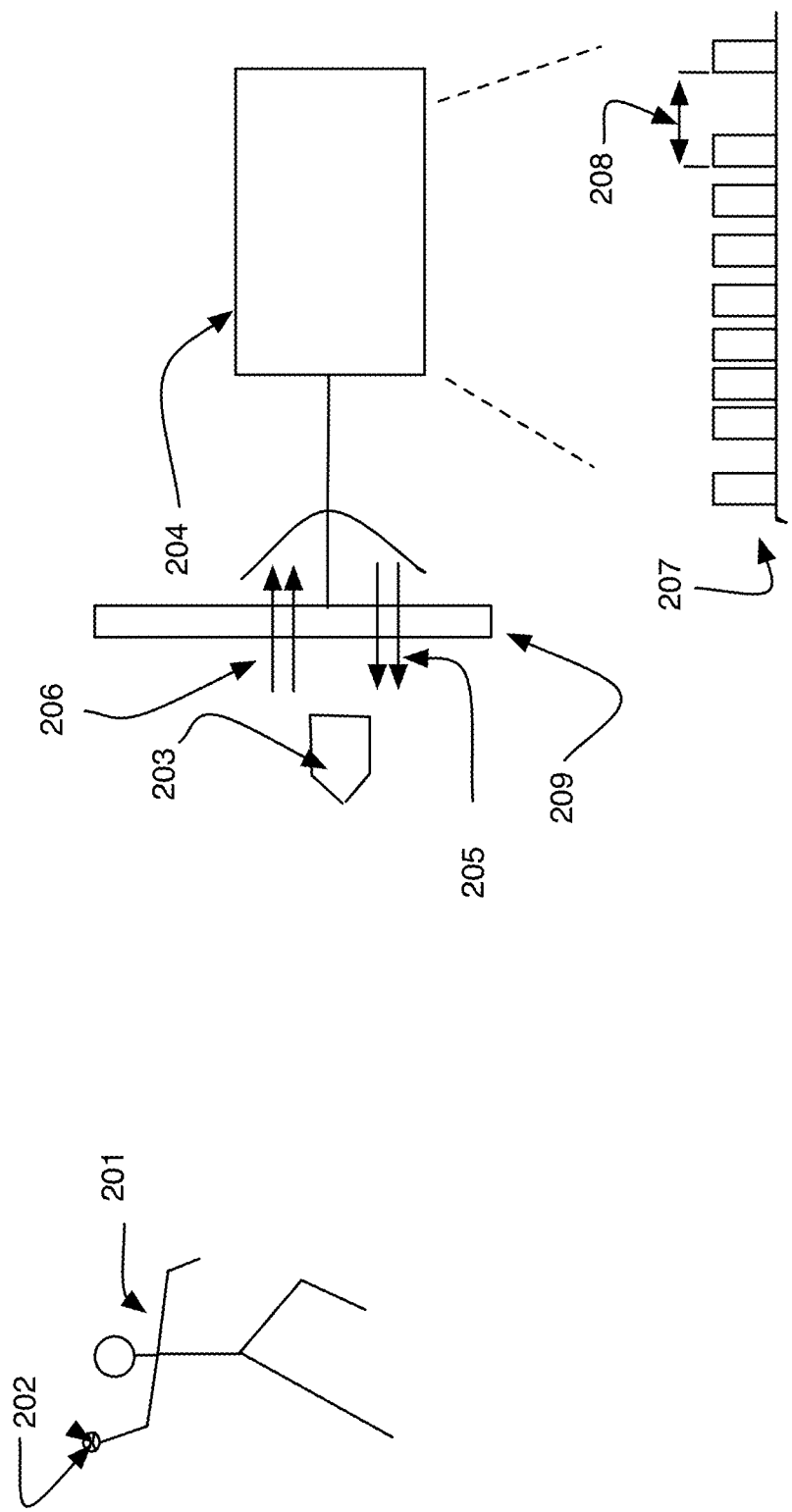
FIG. 2 is a block diagram of a radar sensor of the embodiment of FIG. 1A.

It is expected that these time measurements, due to some of the uncertainties involved in RF transmission, will have small errors. The goal is $+/-1/1000$ second accuracy, which represents good accuracy for most athletic timing systems as well as synchronization of most video/photographic systems, though efforts will be taken to not constrain the accuracy of the system to that number. Note that the trigger is used to synchronize timing. It is not always used to trigger an event at the time of the trigger. In the example the aggregator 111 begins recording video prior to receiving a trigger 121. The aggregator then edits the stored video to produce a clip around the time of the event of interest. Referring to FIG. 2, the raw data available from the radar sensor that is to be analyzed is shown. A pitcher 201 pitches a ball 202 towards a target 203. A Doppler radar device 204 as is known in the art sends out radio frequency wave pulses 205 towards the pitcher. Reflected wave pulses 206 are captured by the device and beat against the sent pulses to produce a signal 207. The signal is a set of electronic pulses occurring along a time axis. The separation 208 between electronic pulses is inversely proportional to the speed of the object off which the wave pulses were reflected. In many situations there is an interfering object 209 between the sensor 204 and the pitcher and target. Exemplary interfering objects include protective screens. In actual use the protective screens may be made of non-rigid material that moves in front of the detector and thus produces an interfering Doppler radar signal.

The procedures described herein allows the system to filter the Doppler radar signal to distinguish signals from such interfering objects from signals of interest, the moving ball.

Figure 3:
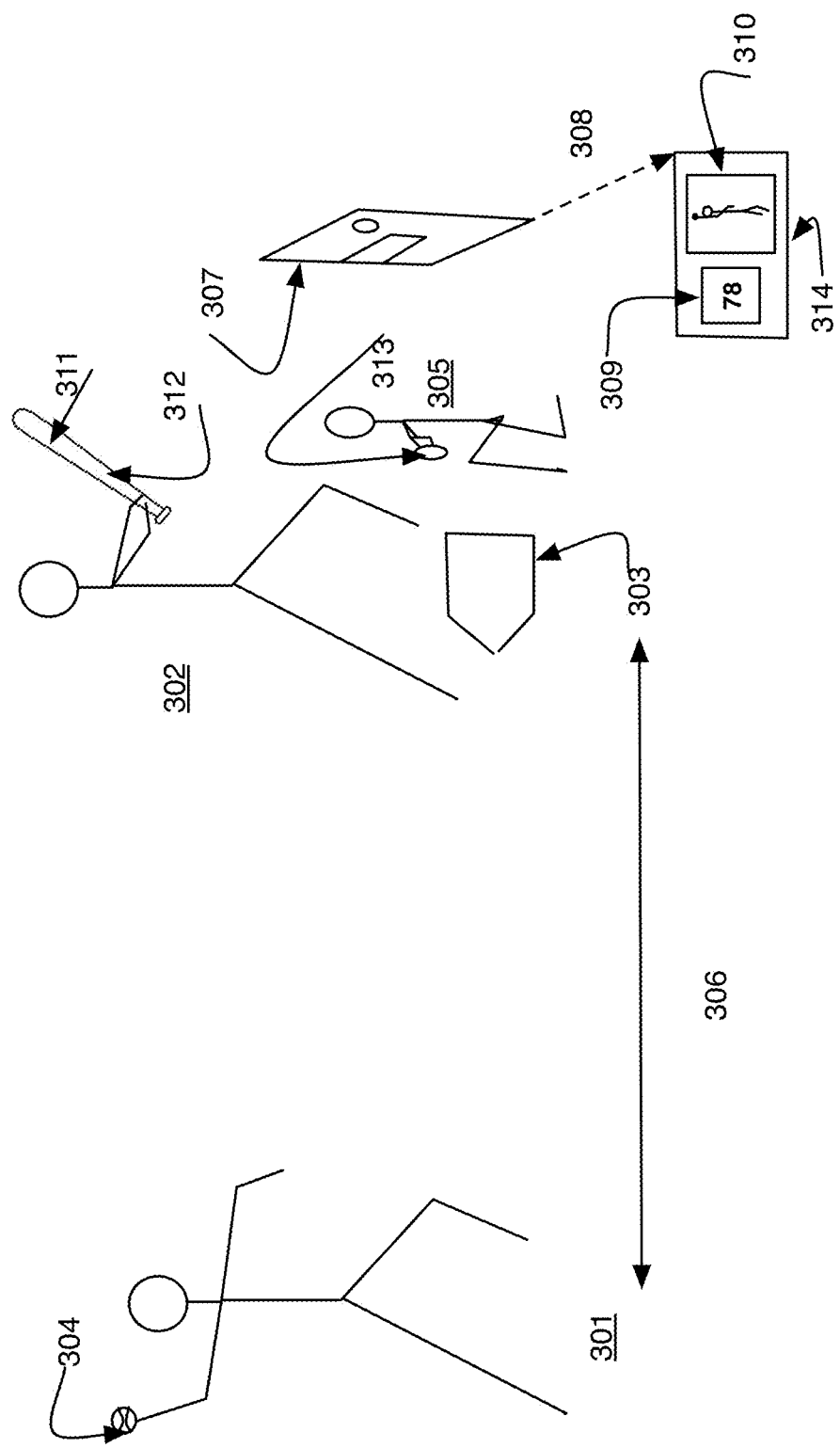
FIG. 3 is a diagram showing additional sensors in a baseball embodiment.

Referring now to FIG. 3 an embodiment using a series of sensor is shown. As before a pitcher 301 pitches a ball 304 towards a target 303. The target is at a known distance 306 from the pitcher. A catcher 305 is located at the target 303 and uses a mitt 313 to catch the ball. In one embodiment the mitt includes a sensor that detects arrival of the ball. Non-limiting exemplary detectors include a piezoelectric detector. The detector includes means (not shown) to transmit a signal to another device upon impact of the ball in the mitt. Behind the catcher is a Doppler radar and video sensor combination 307 that transmits 308 a measured speed 309 and an image 310 to a display 314. In another embodiment the display is incorporated in the same device 307 as the sensors. The embodiment further includes a hitter 302 that is using a bat 312. The bat further includes sensors 311 embedded in the bat to detect motion of the bat and impact of the bat with the ball. Non-limiting exemplary sensors are accelerometers and piezoelectric sensors known in the art. The sensors 311 in the bat further include electronics to wireless transmit a signal to other devices upon detection of acceleration of the bat. Non-limiting wireless transmitters include Bluetooth and wireless internet devices known in the art. In one embodiment the system therefore includes a video sensor, a Doppler radar sensor, a piezoelectric sensor in the mitt 313 and an accelerometer sensor in the bat. All of the sensors include the capability to wireless send the output of the sensor to other nearby devices. In another embodiment a method of using the combined sensors uses the sensor in the mitt to determine that a ball has been caught and therefore pitched. Because the pitcher is at a known distance 306 from the mitt the time of release of the ball can be calculated based upon measurement of the speed of a detected object by the Doppler sensor immediately prior to the impact in the mitt. The time of release allows for capturing and storage of video of the windup and release of the pitcher. If no impact in the mitt is detected but acceleration and impact on the bat is detected then the time of release of the ball can be similarly detected and appropriate video selected and stored. Note that the impact on the mitt or the impact on the bat provide extrinsic data to indicate that valid radar data should have occurred just prior to the impact event. The impact event constitutes extrinsic data that allow filtering of the radar pulse data. The distance 306 between the pitcher and the target represents intrinsic data that is used along with a measure of the speed to determine the interval of time prior to the impact on the mitt when the ball must have been in flight. Radar pulses outside of this interval should be discarded. Extrinsic data is the alerts of trigger events sent by each of the various sensors that is used to filter and improve accuracy of the data collected around the pitch event. Intrinsic data is information that is known about the event. Non-limiting exemplary intrinsic data includes the known distance between the pitcher and the target (and mitt) and therefore a known transit time for a given speed, the fact that the ball must be decelerating once it leaves the pitcher's hand and the fact that there must be a minimum speed based upon the known dimensions in order for the ball to reach the mitt on a fly, and there is a maximum speed that a human being can throw a baseball. The measurement of the speed is therefore analyzed in terms of both the extrinsic data and the intrinsic data to improve the accuracy of the measured and reported speed. In one embodiment the measured speed is checked for consistency between the measured value and the intrinsic data. In the embodiment shown the ball 304, the bat 311 and the catcher's glove all include sensors and transmitters. Each of the devices are used as a marker to send trigger events to the aggregator 314. The ball 304 and the bat further provide data on rotation of the ball and acceleration of the bat respectively. As such the devices embedded in the ball and the bat also act as Producers of data that is sent on to the aggregator 314. The combined radar and video device 307 also acts as a Producer of data that is sent to the aggregator 314. The aggregator is programmed to edit the video received from the producer 307 into a segment of interest around the triggers received from the markers in the ball 304, bat 311, and glove 313. The aggregator further displays 310 the video with added information 309 relevant to the time of the edited video. In the case shown in FIG. 4 a video of the pitcher motion is combined with the speed of the pitch 309. In other embodiments the data further includes the rotation of the ball 304.

Figure 4:
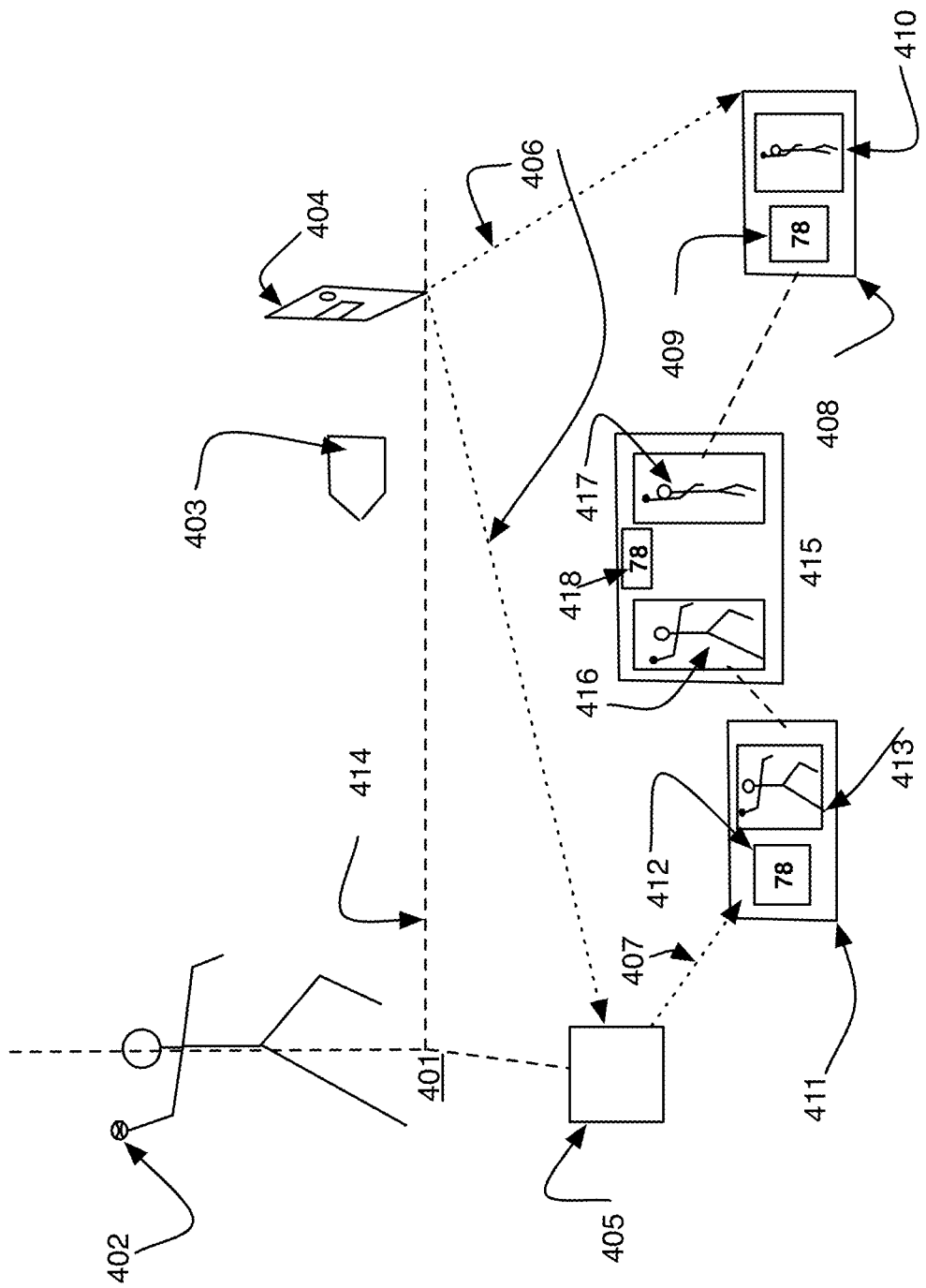
FIG. 4 is a diagram showing a second video sensor added to the embodiment of FIG. 1A.
Figure 5:
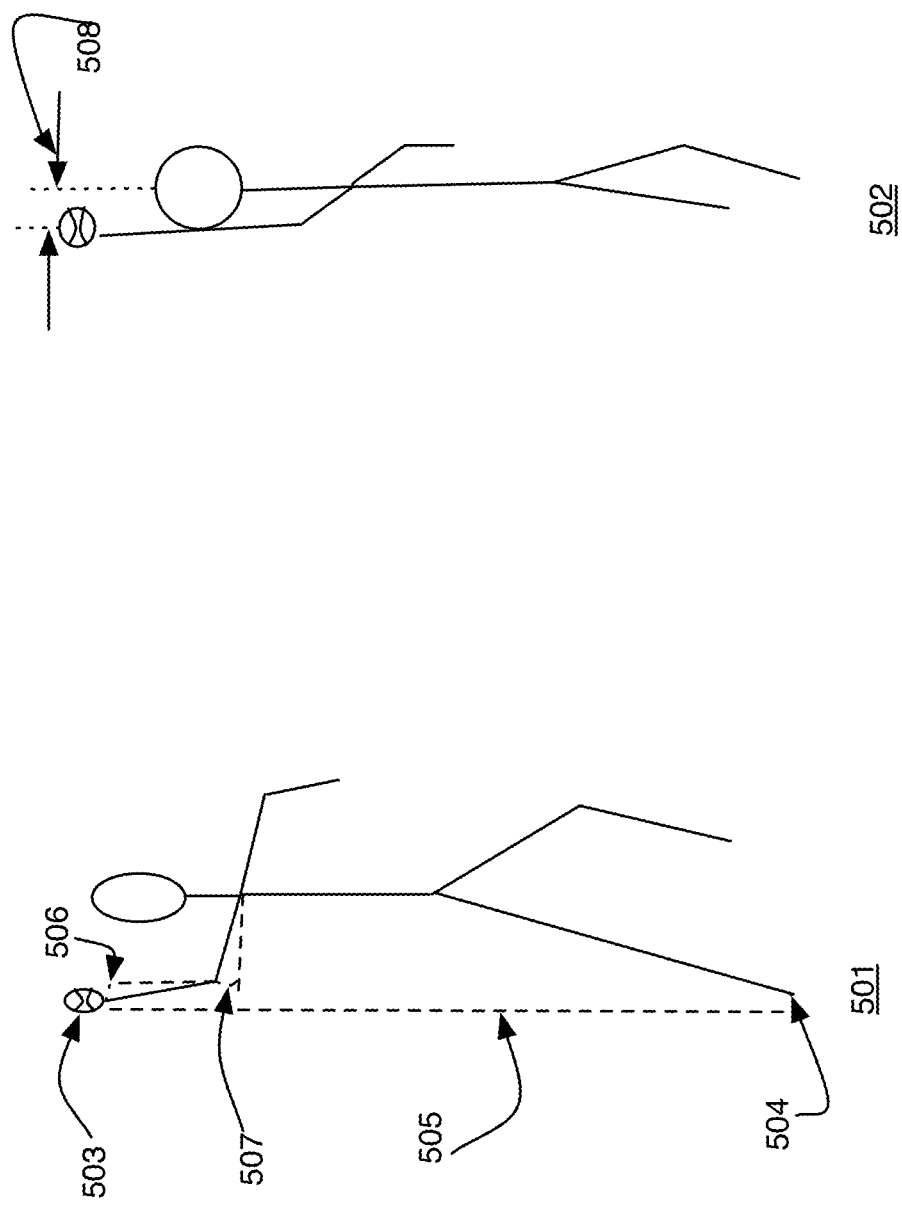
FIG. 5 is a diagram showing exemplary analysis of video data from the embodiment of FIG. 4.

In another embodiment shown in FIG. 4 a second video system 405 is added to that already discussed. A pitcher 401 throws a ball 402 towards a target 403 first radar and video sensor 404 captures the event and transmits 406 the information to a display 408 where a first view 410 of the pitcher is shown as well as the speed 409 of the thrown pitch. The first sensor also sends 406 a signal to a second video capture unit 405. The second video capture unit acquires a second view 413 of the pitcher and transmits 407 that view to a display 411. The second display may also show the measured speed of the pitch 412. Intrinsic data in the embodiment includes a coordinate system 414 shown here as a Cartesian coordinate system with the pitcher at the origin. The intrinsic data further includes the locations of radar and video sensor 404 and the location of the second video sensor 405. Extrinsic data includes the video and Doppler radar measurement data sent between the sensors. The second video sensor and the intrinsic data of the known location allows further data analysis of the video as shown in FIG. 5 and discussed below. In one embodiment there is further included a third aggregator 415 that accepts data from the previous two aggregator displays to produce a display of both orientations 416, 417 and data 418 related to the event.

Referring to FIG. 5, the views from the two video sensors are shown. It is known that in the physics and physiology of pitching a baseball the form of the pitcher is critical. Exemplary measurements include the three dimensional coordinates of the ball 503, the three dimensional location of the planted foot 504, the distance 505 between the planted foot and the ball throughout the motion of the pitch, the angle 506 that the pitcher's forearm makes with vertical, the angle 507 the pitchers upper arm makes with the horizontal and the distance 508 between the ball and the central axis of the pitcher. In one embodiment the video image 502 from the first video producer sensor is synced with the video image 501 from the second video producer sensor by temporal alignment of the frames that occur at the time the ball hits the mitt and the marker sensor in the mitt sends an alert signal. This ensures that individual frames in the two views are taken at the exact same moment of time. Since the two video sensors are at known locations with respect to each other and with respect to the pitcher. The measurements 503-508 can be made throughout the pitcher's motion of throwing the ball. The measurements require the use of the intrinsic data of the coordinate system at location of the sensors and the pitcher within that system and the use of the extrinsic data of the syncing of the video frames to each other based upon the time the ball hits the mitt. The aggregator 415 shown in FIG. 4 combines the data to produce a synchronized video of both views with data regarding the event.

Figure 6:
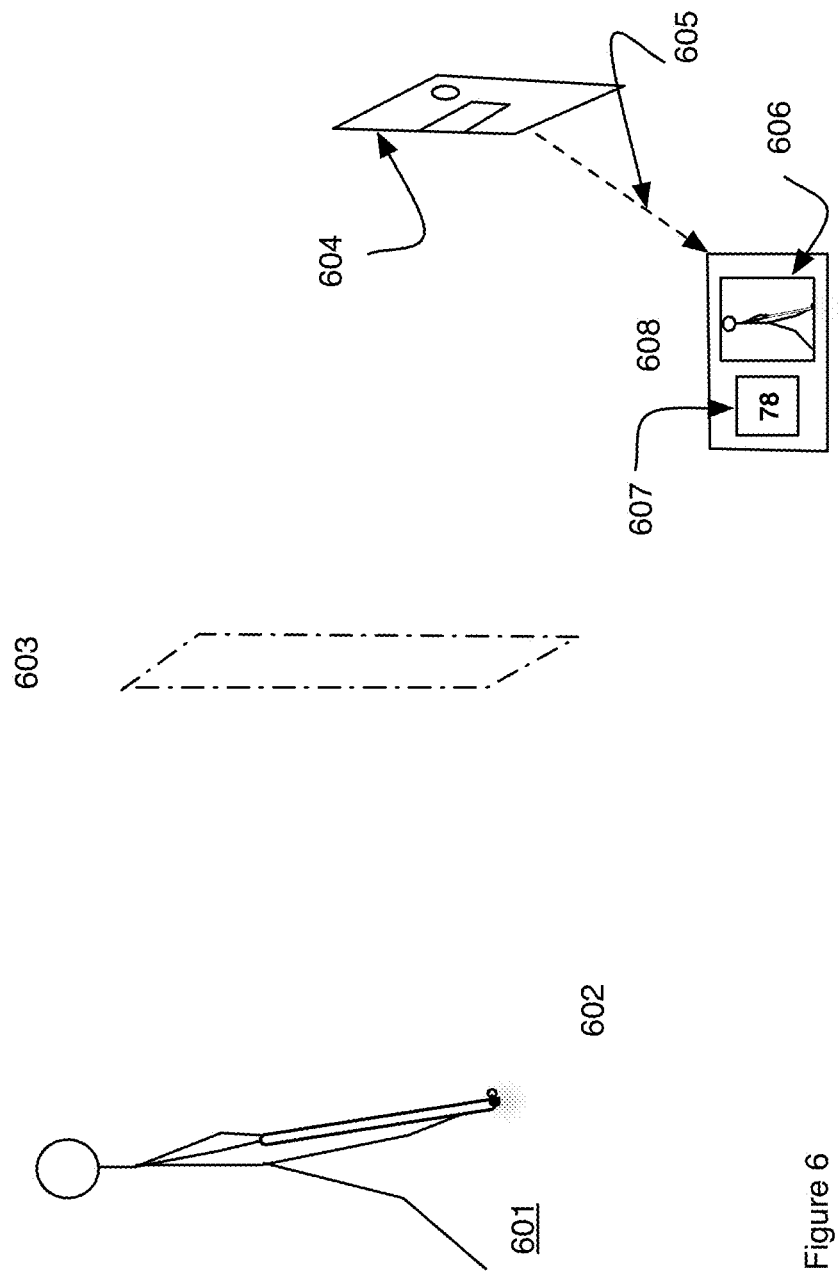
FIG. 6 is a diagram of a golf example.

The techniques discussed are applicable to a wide variety of sport and non-sport measurement situations. The techniques have been demonstrated thus far with respect to measurements of a thrown baseball. Referring to FIG. 6 an application in golf is shown. A golfer 601 strikes a ball 602 a marker sensor 603 detects the golfer striking the ball and sends an alert signal (not shown) to other sensor devices. Non-limiting examples of the sensor 603 include a microphone. In one embodiment other producer sensor devices include a radar gun and a video camera 604. The radar gun and video camera send 605 a signal to an aggregator analysis and display device 608. The aggregator analysis and display device makes use of the extrinsic data of the signal from 603 to capture and display 606 the appropriate video segment of the golfer's swing and also report the velocity 607. The velocity reported can be that of the club head, the golf ball or some portion of the golfer's body. The extrinsic data of the sensor 603 that detects the impact can allow analysis of the radar and video sensor data. The intrinsic data is that the swing happens before impact and the ball traveling and swing follow through happen after impact. This allows automated editing of the video to capture the swing and the follow through as well as the velocity and trajectory of the golf ball after impact.

Figure 7:
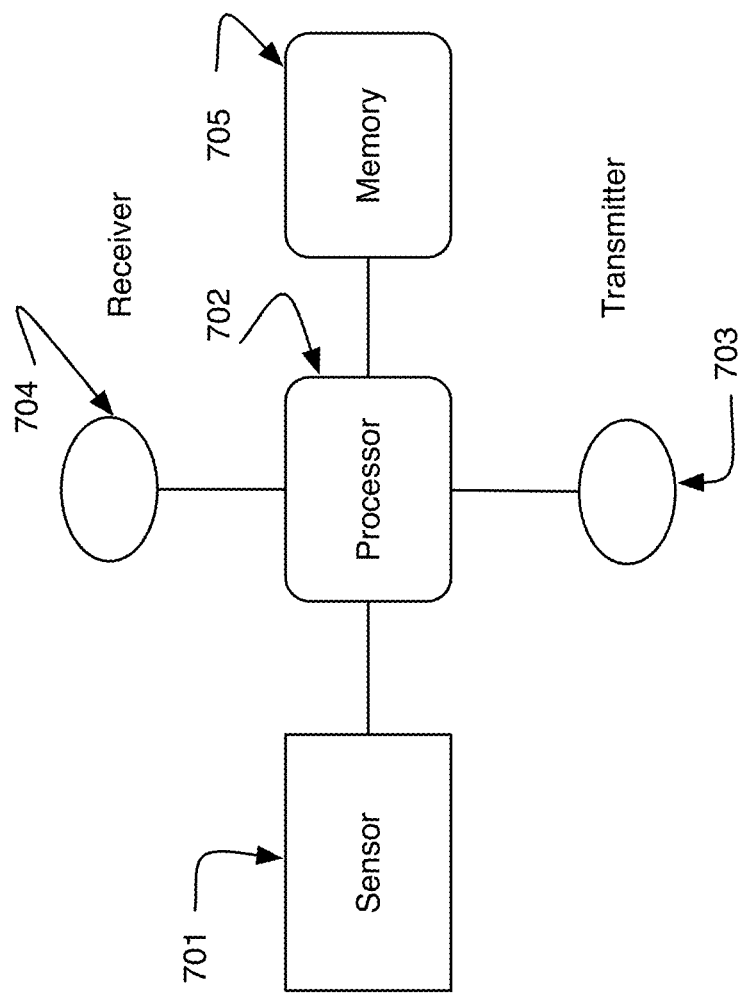
FIG. 7 is a block diagram of sensor and electronics.

Referring now to FIG. 7 a block diagram of hardware used in an embodiment of the invention is shown. A sensor 701 is connected to a processor 702 and memory 705. In one embodiment data is continuously acquired from the sensor and stored in memory. The hardware further includes means to communicate to other sensors and processors. The communication means includes both a transmitter 703 and a receiver 704. Non-limiting examples of communication means include wired and wireless networks, Bluetooth and radio frequency identification tags, all known in the industry. In another embodiment a sensor includes only the ability to transmit a signal and not to receive. In another embodiment the sensor is a standalone device and the processor of a second sensor detects only an electrical pulse from the first sensor as an alert to an event. An example of such a sensor would be a piezoelectric sensor or a microphone that results in an electrical pulse when the sensor is struck or a loud sound such as a bat hitting a ball is detected. In one embodiment the sensor signal is not recorded continuously. The physical location of the components of the system can be varied. In one embodiment all components are located in a single package. In another embodiment the sensor is remote from the processor and transmits a signal either by wire or wirelessly to the processor. In another embodiment the memory or processor or both may be located remotely from the sensor and accessed via a network or the Internet.

Figure 8:
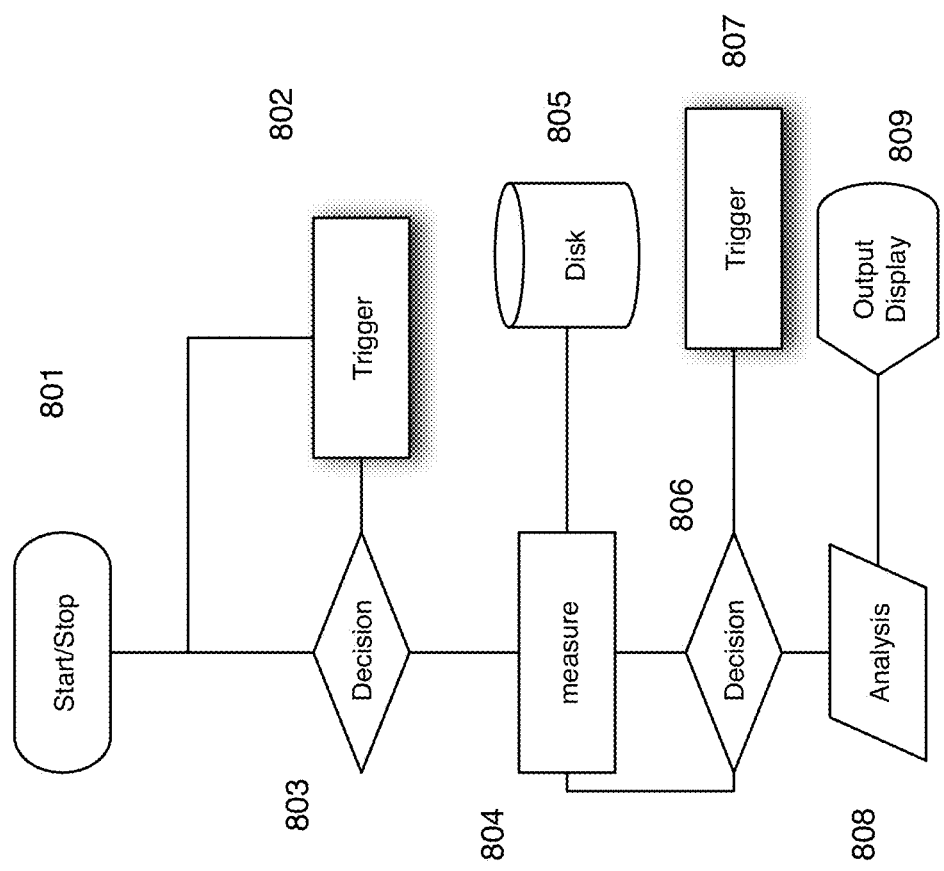
FIG. 8 is a flow chart of a data analysis embodiment.

Referring to FIG. 8 a method of using sensors is described. A system contains at least one sensor as described in FIG. 7. In a preferred system there are two or more sensors. Sensors are used as markers that send triggers to initiate data acquisition by another sensor or are producers that acquire data upon being triggered. The sensors are activated 801. In a preferred embodiment the sensors are markers and they are activated by an aggregator. In one embodiment the sensors then wait for a trigger 802 from a marker sensor where a decision is made to go to taking measurements 804. The trigger 802 may come from activation by the user or alternately may come from a signal received from a second marker sensor. Once activated the producer sensor makes measurements 804 and stores the results of those measurements to memory 805. Non-limiting examples of producer sensors include video sensors, audio sensors, Doppler radar sensors, piezoelectric devices, and accelerometers. The producer sensor continues to make measurements and simultaneously monitors and decides 806 whether a trigger 807 is received. Once a trigger is received the system aggregator then proceeds to analysis 808 of the stored data resulting in activation of output 809 of the results. Output 809 includes display of the results, such as display of the video or edited portion of the video, display of a measured speed, or display of results appropriate to any of the other example sensors described above. Output could further include an alert signal sent to a user or to other sensors that may act as the alert 802 to cause data acquisition to begin or alert 807 that would cause analysis of the data to begin.

Figure 9:
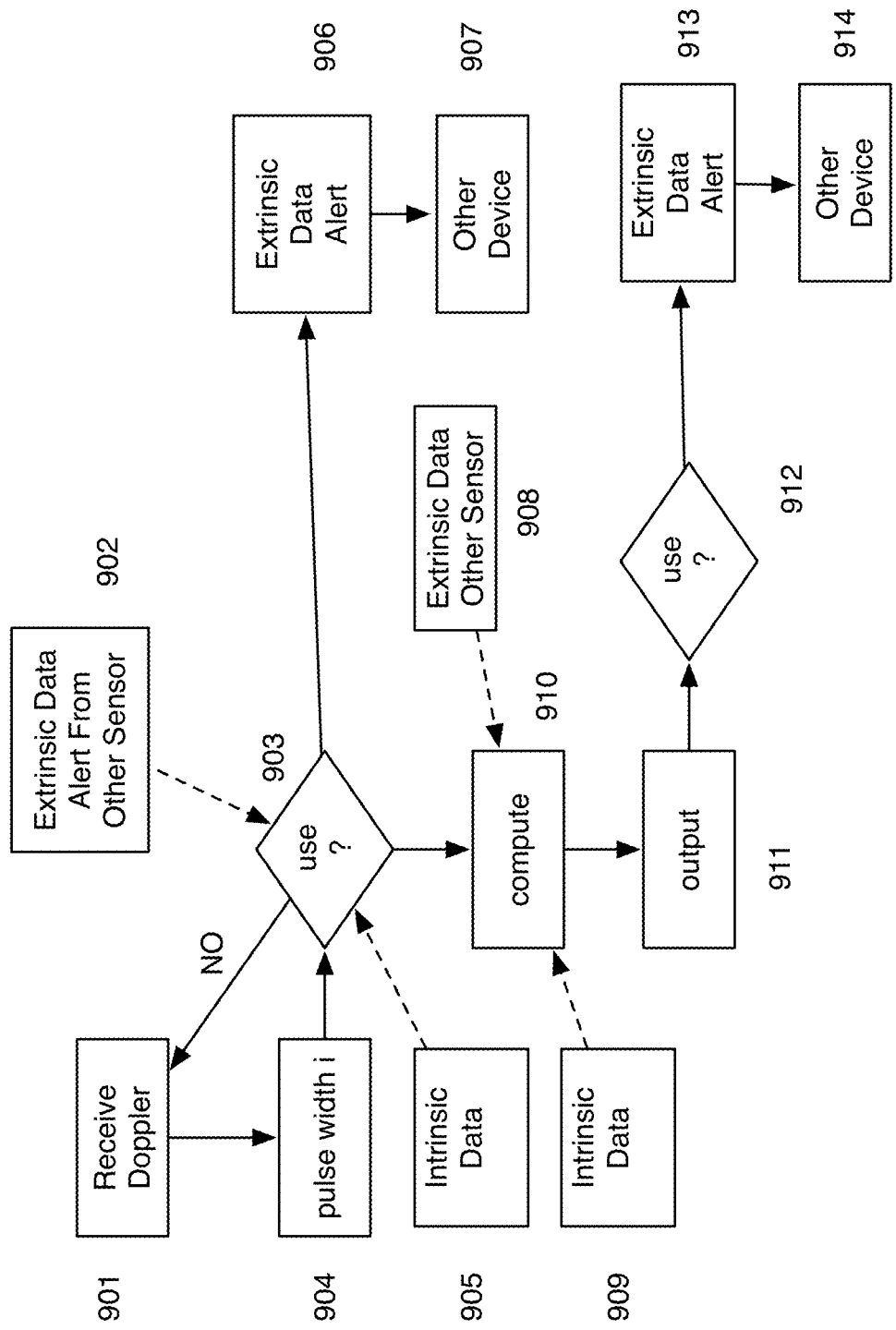
FIG. 9 is a flow chart showing an embodiment using both extrinsic and intrinsic data.

FIGS. 9-14 show the specific example of application of embodiments of the invention to the capture and analysis of Doppler radar data. The example makes use of a Doppler radar signal, but those skilled in the art will see the applicability to other speed measurement techniques such as those using light and other media reflected from a moving object. Referring to FIG. 9, an aggregator processor receives 901 a Doppler radar signal and determines 904 the pulse width that is an indication of the speed of an object within the filed of view of the producer sensor. In one embodiment the receive 901 data includes storing the data to computer memory for further analysis. A decision 903 is made as to whether to "use" the data. The use of the data may include storage to disk, continue to a further computation and analysis step 910, sending an alert or trigger message 906 to a second sensor 907. The decision 903 as to use may include using both intrinsic 905 and extrinsic 902 data. Exemplary intrinsic data includes the pulse width of the signals received must be indicative of a certain minimum speed of object or a certain maximum speed of an object. It is known for example in an application of tracking the speed of a baseball pitch the ball must be thrown at a certain minimum speed to reach home plate on a fly and that humans thus far are not capable of pitching a ball much faster than about 100 mph. Exemplary extrinsic data 902 a switch activated indicating a game has begun, or that a pitching motion has been initiated, a motion sensor detecting movement by the pitcher, a timer indicating a scheduled event is to take place. A trigger signal from a marker that is a piezo electric or other device indicating a pitch has arrived at the catcher is an example of extrinsic data that can initiate the path towards the computation step 910. At this step again both intrinsic and extrinsic data is used to inform the computation. Example extrinsic data includes a signal that a ball has arrived at the catcher. This is combined with the intrinsic data that the pitcher is 60 feet from the catcher and therefore if the ball was within the range intrinsically known for a pitch the pitch must have take place in a known time interval prior to arrival. Compute 910 includes a series of filtering steps based upon the extrinsic and intrinsic data. The compute and filtering steps are described in detail in the Figures that follow. After computing an optimum value based upon analysis and use of intrinsic and extrinsic data the result is then output 911. Output may include output to a display or reporting to a user by other means. The output step is followed by a decision 912 as to whether the output is such that an extrinsic alert 913 should be sent. Parameters for the decision 912 can be pre-set by the user. An example of a pre-set is that if the pitch exceeds a given speed an alert 913 is sent and another device 914 is activated. An example of such a situation would be where the pitch exceeds a given speed and an alert is sent to capture the video associated with the pitch.

Figure 10:
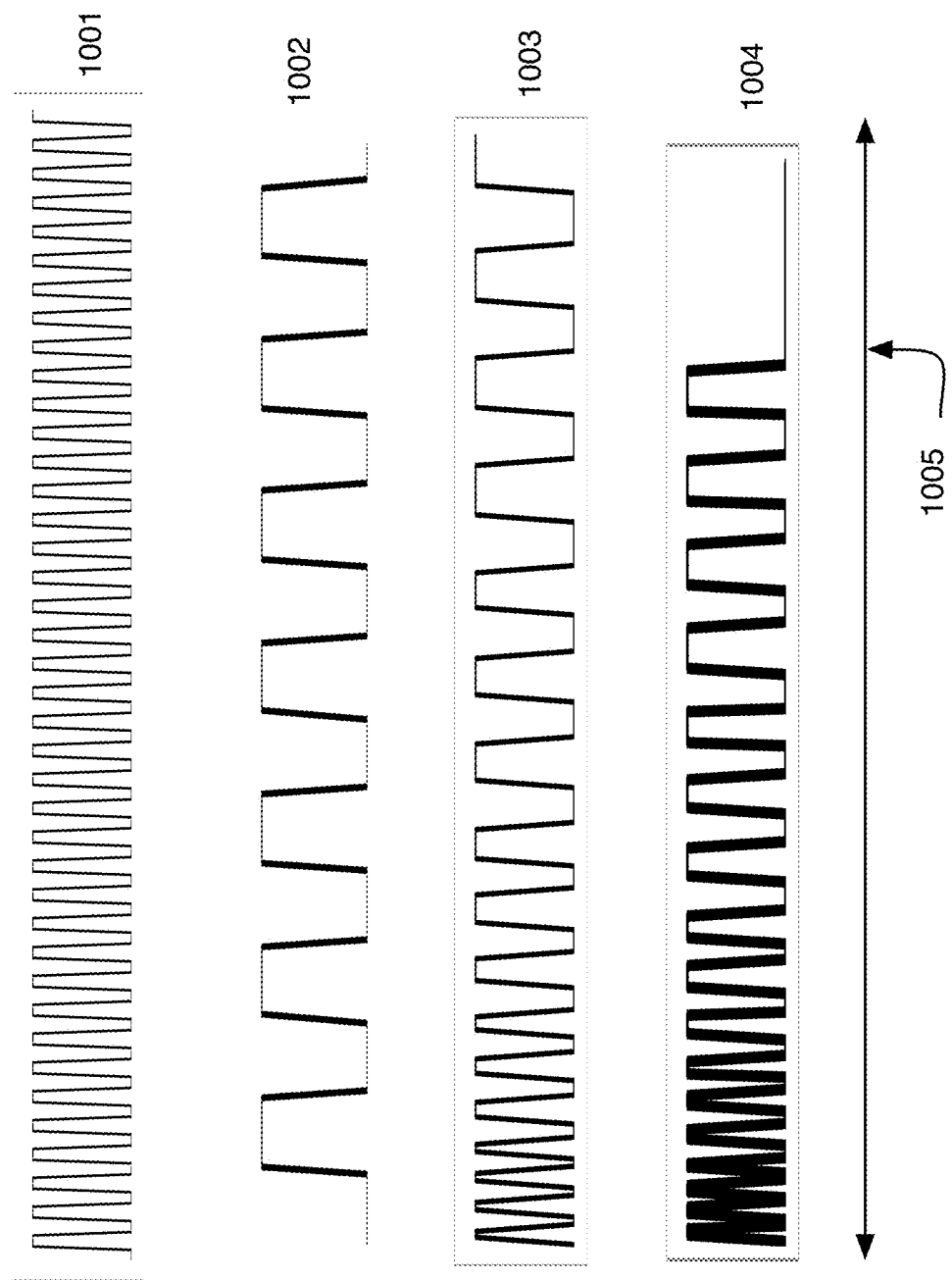
FIG. 10 is exemplary data from a radar sensor.
Figure 11:
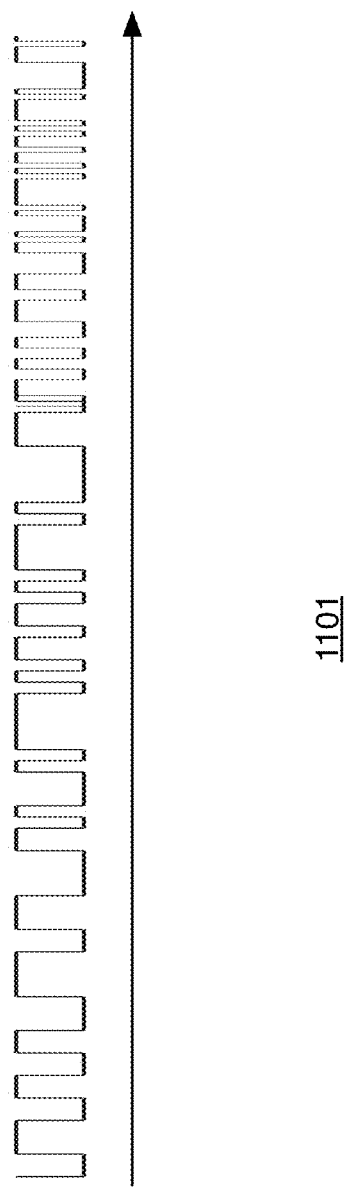
FIG. 11 is exemplary data from a radar sensor showing combined data from multiple objects.

Referring now to FIG. 10, exemplary pulse data that might be observed from a Doppler radar device is shown. The data consist of a series of electronic pulses versus time. The horizontal axis 1005 for all data sets represents time. The pulses result from reflection of a radio frequency beam off an object within the path of the beam of the device that is combined with a sent signal. The pulses are a measure of the shift in frequency of the reflected beam due to the Doppler effect. The speed of an object can be measured using a single pulse cycle where the width of the cycle is inversely proportional to the speed and the proportion constant is a function of the radio frequency of the beam used in the radar device. The pulses may be consistent and at a relatively high frequency 1001 indicating a constant speed and fast moving object within the field of the sensor. Alternatively the signals may be evenly spaced and relatively low frequency 1002 indicating a constant and lower speed. The signals may also change in frequency versus time 1003 indicating an object that is slowing down. Finally in the examples the signal 1004 may be indicative of an object that is slowing down and then at some point stops or disappears from the view of the radar device resulting in no signal as seen as the flat portion of the signal in 1004. The actual signal typically observed is not as clean as shown in the hypotheticals of FIG. 10, but rather is a composite of all the signals as seen in FIG. 11. The typical signal is a composite because there is not a single object within the view of the sensor. In a baseball application, there will be signals from movement of the pitcher, catcher, the umpire, the hitter, safety screens and perhaps others in addition to the signal of interest being the pitched baseball. The task is to accurately filter the data to select the signal of interest. This is done through use of extrinsic and intrinsic data as shown in FIG. 12.

Figure 12:
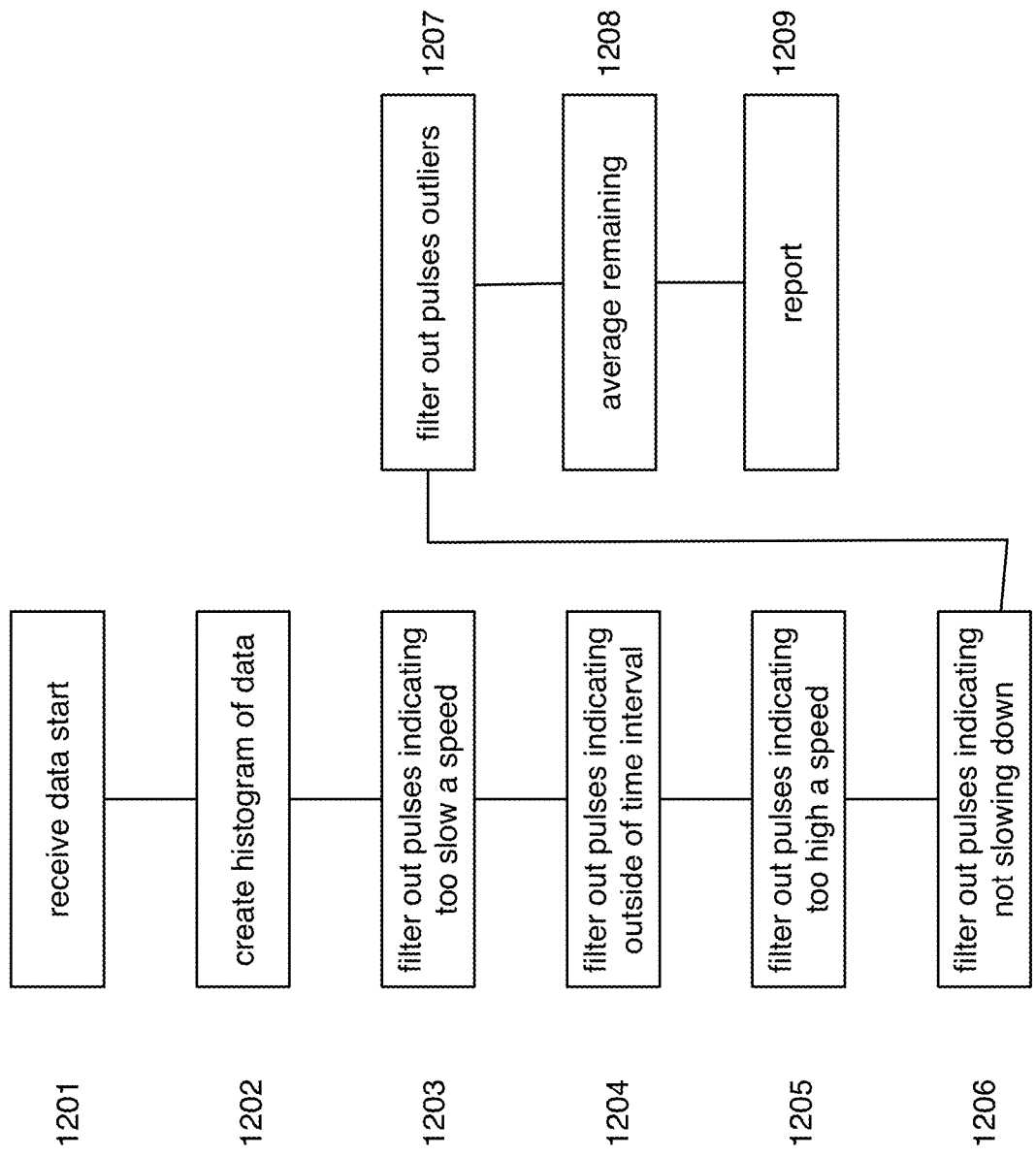
FIG. 12 is a flow chart for calculating an optimum speed for a radar signal.

Referring to FIG. 12, in an embodiment for calculating the accurate speed of an object of interest. Data is received from the sensor 1201 and the data is sorted into buckets representing data ranges of pulse widths thus creating a histogram 1202 of the pulse width data. The data is then taken through a series of filtering steps to remove data not of interest. Although shown in a particular order it will be clear to those skilled in the art that the order of some steps may be swapped and in some embodiments not all of the steps are used. The data is first filtered 1203 removing those histogram intervals that represent pulses that would arise from too slow an object. The filter is based upon intrinsic data for example that a pitched ball must have a certain minimum velocity to represent a ball pitched from pitcher to catcher. In applications other than baseball other intrinsic data would apply for selection and filtering. The data is then further filtered 1204 removing pulses that are outside of the time interval of interest. This filter is based upon both extrinsic data from a sensor that indicates arrival of a ball at the catcher and intrinsic data based upon known distance from the pitcher to the catcher, a known reasonable range and therefore a known time interval of interest. The data is then filtered 1205 removing pulses that indicate too high a speed. This makes use of intrinsic data that a human is likely to pitch a baseball less than a certain speed for example approximately 106 mph, the current record speed for a major league baseball pitch. The intrinsic data is adjusted based upon the situations. Measuring the speed of pitches thrown by little league players would indicate a lower maximum value of interest. The data is then further filtered 1206 to remove pulses from objects that are not slowing down. The intrinsic data in this case is that a pitched ball is necessarily slowing down. If a pulse train indicates a constant or even accelerating speed then it is not likely a result from reflection off a pitched baseball. The histogram is then further filtered 1207 to remove outliers. Outliers may be a result of electrical noise in the sensor circuitry or outliers may represent data that is not of interest. An example of the latter is that it is known that the baseball is slowing down. Comparisons between pitchers and between pitches from the same pitcher ought to pick either a point in time or the maximum speed the baseball reached during the pitch. The remaining data intervals are averaged 1208 and the result reported 1209. Reporting 1209 as described earlier may indicate a display on an output device and may include signals sent to other devices based upon the calculated results.

Figure 13:
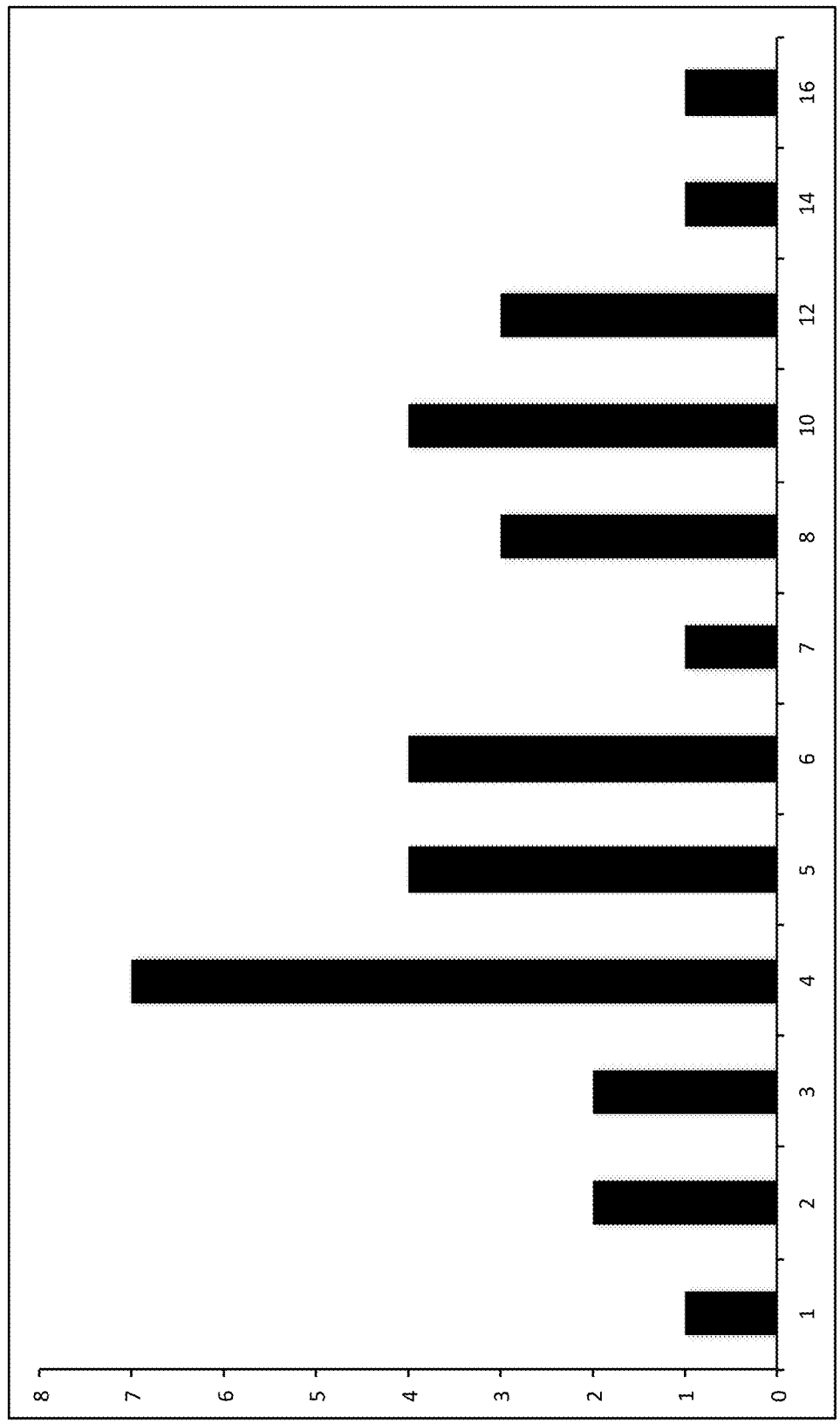
FIG. 13 is a histogram of radar sensor data showing an analysis embodiment.

FIG. 13 shows a typical histogram of data from a pitched ball. The x-axis represents the pulse widths and the y-axis represents the relative number of counts of pulse widths that fell within an interval indicated by the x-axis. Those pulses with smaller numbers represent data from a relatively faster moving object.

Figure 14:
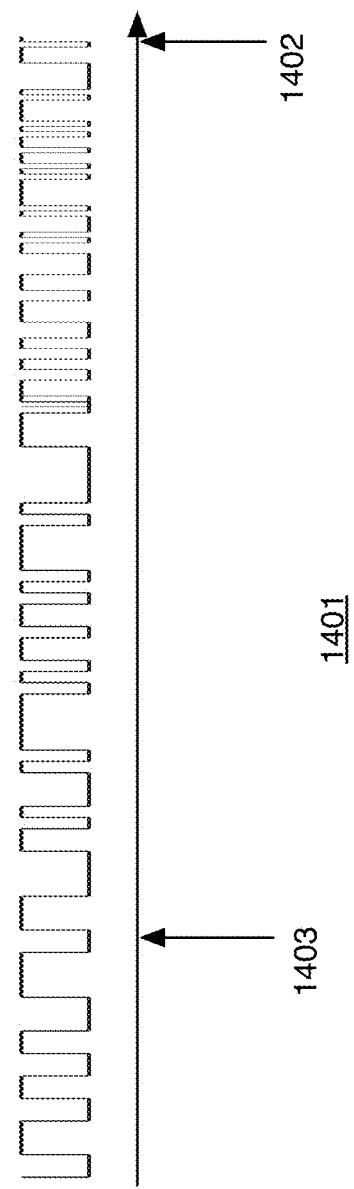
FIG. 14 is exemplary data showing time interval filtering.

FIG. 14 shows graphically a filtering of the data based upon time interval. A typical pulse train 140 is received. At a particular time 1402 an extrinsic signal of an event is received. In one embodiment the extrinsic signal is a pulse from a second sensor indicating a ball arrived at the catcher's mitt. Based upon the intrinsic data relative to the measurement at hand, a baseball being pitched from a pitcher a known distance away and that the pitched ball will have a speed within a given interval a point 1403 is calculated that represents the earliest time of interest. Data outside of the time interval between 1420 and 1403 is removed.

Figure 15:
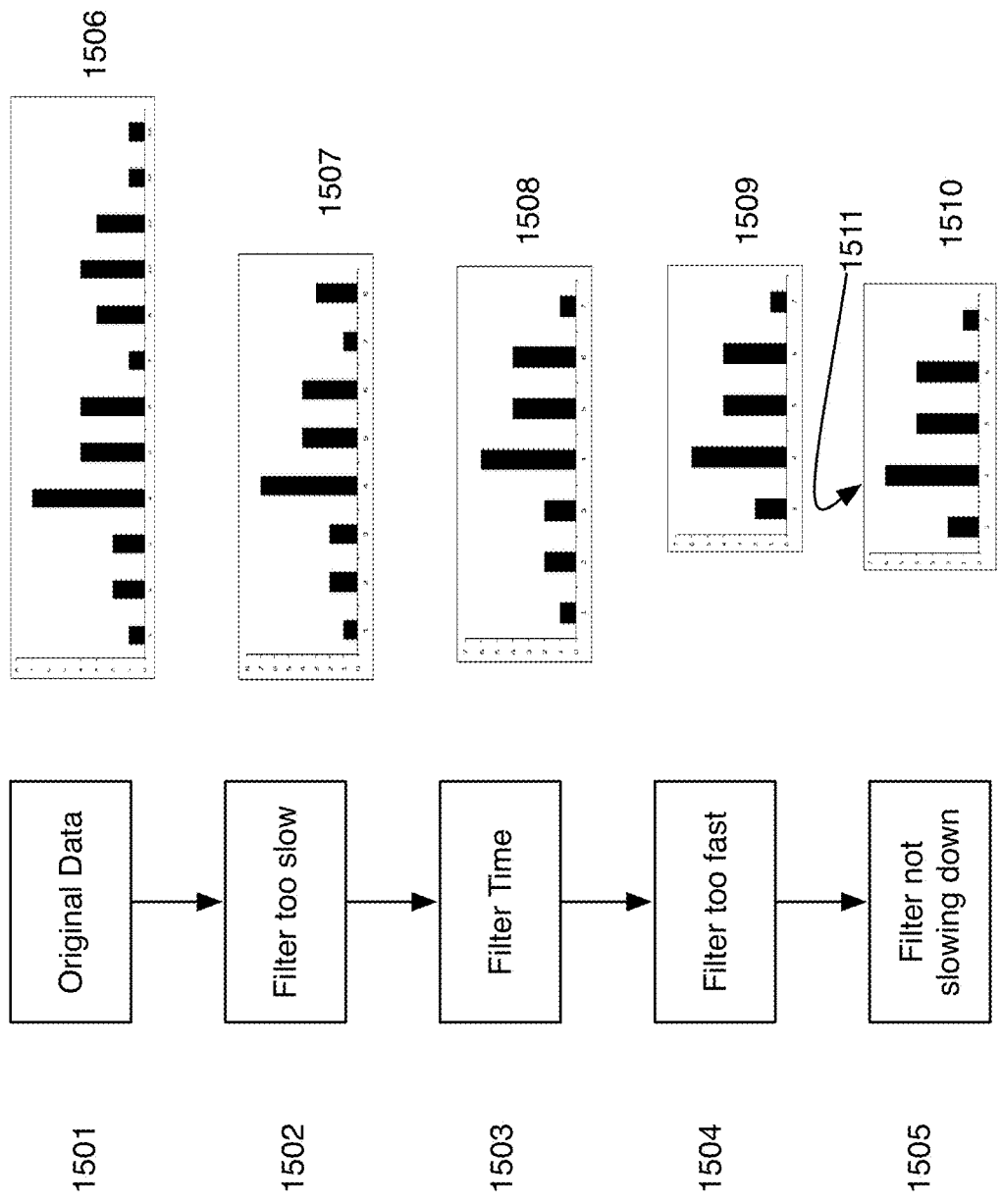
FIG. 15 is an illustrated flow chart showing histogram of data after computation steps.

Referring to FIG. 15 the filtering steps are shown graphically against the data histogram. It should be kept in mind that the filtering results are indicated by the histograms. The actual analysis/filtering is done on the raw pulse train data such as depicted in FIG. 11. Filtering implies removing pulses from this pulse train data set and recalculating a histogram from pulses that are not removed. The original data is received and is histogram is known to be a result of a composite of reflections off various objects within the field of view of the sensor. The data is filtered 1502 to remove those objects moving too slowly to be of interest. The resulting histogram 1507 shows data for larger pulses (to the right end of the graph) removed. The data is then filtered 1503 for the time interval of interest. The resulting histogram 1508 shows data again removed primarily from the right hand side. This is indicative of a situation where the extraneous other objects within the field of view not associated with a pitched ball are moving slower than the pitched ball of interest. The data is then filtered 1504 removing data indicative of reflection of objects moving faster than would be expected or removing data that is simply electronic noise. The resulting histogram 1509 shows points removed from the left of the chart. Finally the data is filtered 1505 removing data indicative of objects that are not slowing down. The resulting histogram is shown in 1510 and could result in data points from anywhere along the pulse width range from being removed. Pulses are identified in this step 1505 by first selecting a prominent pulse 1511 after all the previous filtering that is indicative of the object of interest. In one embodiment the prominent pulse is selected as the most frequently occurring pulse in the histogram. The raw data is such as that shown in FIG. 14 but after the previous filtering steps is reconsidered. The prominent pulse results from pulses counted early in the time interval of interest. If it is seen that a faster pulse occurs later in time that pulse must relate to an event not related to a decelerating object and that pulse is removed from the data set.

Once the filtering step 1505 is completed the data is selected and averaged as already described. In one embodiment just the prominent pulse and the data buckets to either side of the prominent pulse are averaged to produce a measured result.

In another embodiment the filtering step 1206 based upon an object not slowing down is based more generally upon pulses indicating acceleration outside of a pre-selected range. The method is generally applicable to both accelerating and decelerating objects. The specific example of FIG. 15 discussed above filters on the basis of an acceleration value that is less than zero indicating deceleration.

Figure 16:
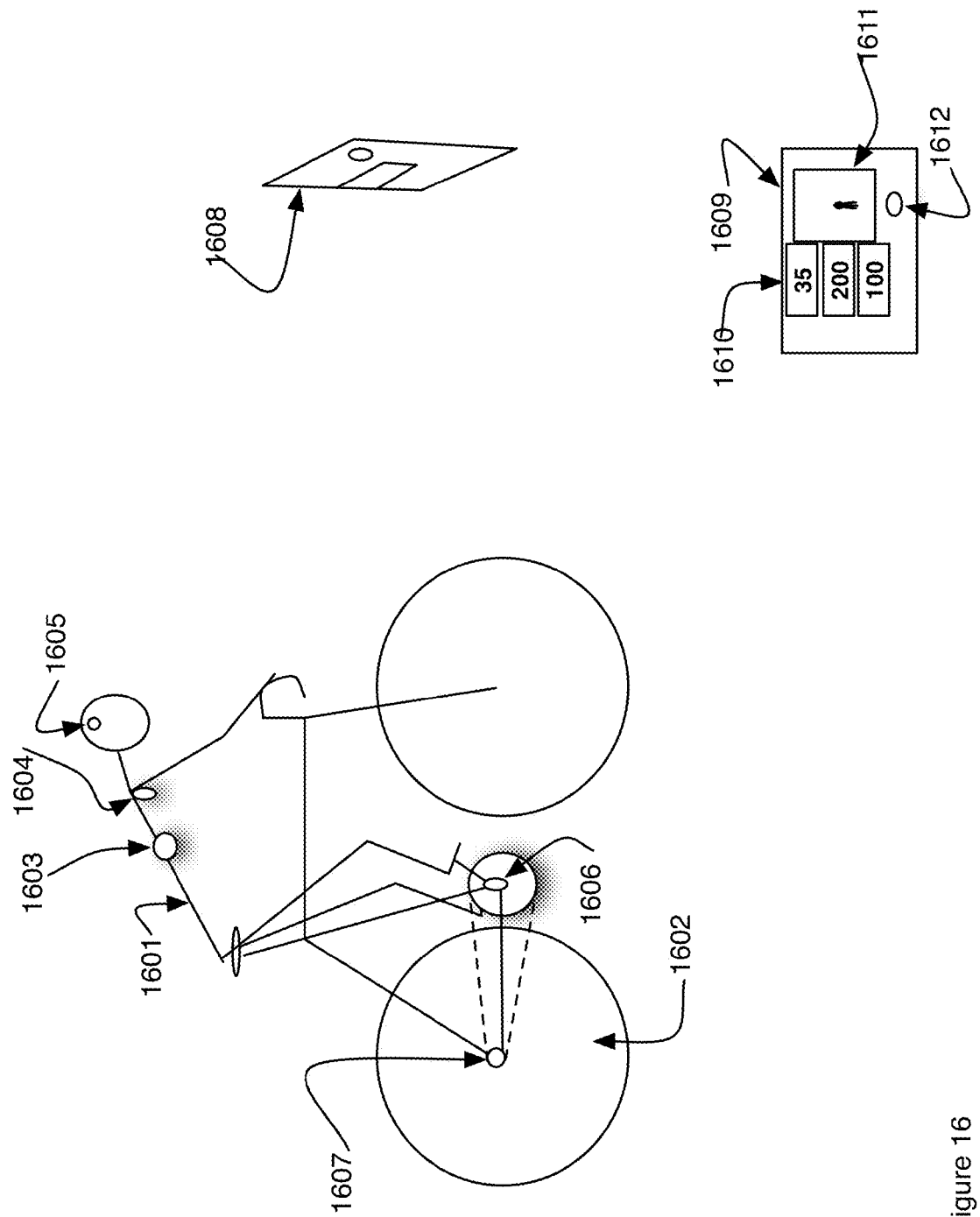
FIG. 16 shows a cycling embodiment including physiological sensors.

In another embodiment shown in FIG. 16, physiological sensors are used in conjunction with other sensors. A rider 1601 is fitted with a heart rate monitor 1603, a blood pressure monitor 1604 and an accelerometer 1605. The bicycle 1602 includes sensors for cadence 1606 and power 1607. The rider is further observed using additional external sensors 1608. Exemplary additional sensors include a Doppler radar sensor and a video sensor. Signals from all the sensors are collected at a processing and display unit 1609. The signals may be sent directly to the unit from each sensor or may be sent through an intermediary collection point. An exemplary system includes local short-range radio frequency communication to a cellular device on the bicycle (not shown) and then the cellular device transits data to the display unit 1609. The display unit shows a video output 1611 and output 1610 from the various sensors. In the example shown the display includes showing heart rate 200, body temperature 100 and speed 35 of the bicycle. The display unit further includes an alert 1612. The alert is programmable based upon intrinsic and extrinsic information. An example of such is the output of the accelerometer may be compared to known intrinsic data of acceleration of a human skull that is likely to result in concussion. Should the speed and video sensors detect a crash of the cyclist the accelerometer will detect acceleration of the cyclist head to determine if the cyclist should be removed from a competition on the basis of a likely concussion. The external sensor data, such as video and a sudden change of the speed of the cycle is combined with the intrinsic data, acceleration likely to cause a concussion to provide an alert and likelihood of injury.

In another embodiment the system of FIG. 16 includes sensors and measurements of physiological parameters on any animal instead of or in addition to the animal being a human animal as shown. In another embodiment the sensors include physiological measurements on both a horse and the rider on the horse.

SUMMARY

A sensor system and method of using the system synergistically to improve the accuracy and usefulness of measured results is described. The system is comprised of electronically linked components that act as markers to trigger events, producers that gather data from sensors and aggregators that combine the data from a plurality of producers using triggers from marker devices to select the data of interest. The system is shown to be applicable to selection of data regions of interest and to analysis of the data to improve accuracy. The analysis of the data of any particular sensor within the system makes use of extrinsic data, being data generated by other sensors and intrinsic data, that is data or data limits that are known to be true from nature, laws of physics or just the particular information the user wants to acquire. The system is demonstrated on the analysis of Doppler radar measurements of a thrown object.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A system for making measurements on moving objects said system comprising:
    a) a video camera sensor that can detect a movement of objects,
    b) a Doppler radar sensor that can detect the movement of objects,
    c) a processor that acquires raw data from the video camera sensor and the Doppler radar sensor, calculates measurements related to the movement of the objects and reports the measurements,
    d) where the processor filters the raw data used in its calculation, said filters based upon both intrinsic information and data acquired by the video camera sensor and the Doppler radar sensor,
    e) where intrinsic information is at least one selected from:
        i) a maximum speed for the objects,
        ii) a minimum speed for the objects,
        iii) the three dimensional location of the objects at a start of the movement,
        iv) the three dimensional location of the objects at an end of the movement, and,
        v) a time interval between the start of the movement and the end of the movement,
    f) where the measurements are at least one selected from:
        i) the average speed of the objects,
        ii) the maximum speed of the objects,
        iii) acceleration of the objects, and,
        iv) a video of the objects during their movement, and,
    g) wherein the video camera sensor detects a movement of the object and based upon that detection sends an alert signal to the Doppler radar sensor, said alert signal activating the Doppler radar sensor to store data.

2. A method for analysis of Doppler radar data said method including:
    a) acquiring pulse data from a Doppler radar sensor, said pulse data having a pulse width, and indicative of a speed of an object within the field of view of the Doppler radar sensor,
    b) preparing a histogram of the pulse data, said histogram comprising parsing the data into time buckets based upon the pulse width of individual pulse data points and a frequency of occurrence of data points within the time buckets,
    c) filtering the data to remove pulse data that is less than a preselected minimum speed,
    d) filtering the data to remove pulse data that indicates a speed greater than a preselected maximum speed,
    e) filtering the data to remove pulse data that occurs outside of a time interval said time interval defined by a second sensor,
    f) filtering the data to remove pulse data that indicates an acceleration outside of a preselected acceleration range,
    g) selecting a bucket from the histogram with the highest frequency of occurrence of pulse data,
    h) calculating a weighted average of the pulse data including the bucket with the highest frequency of occurrence of pulse data and a preselected number of neighboring buckets,
    i) reporting the speed of the object based upon the weighted average pulse width.

3. The method of claim 2 wherein the object is a pitched baseball and the preselected acceleration range indicates a deceleration of the baseball.

4. The method of claim 2 wherein the second sensor is a video camera.

5. The method of claim 2 wherein the second sensor is a sound sensor.

* * * * *